(12) United States Patent
Stefani et al.

(10) Patent No.: US 7,949,335 B2
(45) Date of Patent: May 24, 2011

(54) MULTI-MODAL PORTABLE COMMUNICATIONS GATEWAY

(75) Inventors: Rolf Stefani, West River, MD (US); Andrew Kemmetmueller, Crofton, MD (US); Tim Ralph Russell, Deale, MD (US)

(73) Assignee: ARINC Incorporated, Annapolis, MD (US)

( * ) Notice: Subject to any disclaimer, the term of this patent is extended or adjusted under 35 U.S.C. 154(b) by 841 days.

(21) Appl. No.: 11/869,110

(22) Filed: Oct. 9, 2007

(65) Prior Publication Data

US 2008/0233953 A1 Sep. 25, 2008

Related U.S. Application Data

(60) Provisional application No. 60/896,262, filed on Mar. 21, 2007, provisional application No. 60/914,311, filed on Apr. 26, 2007.

(51) Int. Cl.
*H04W 4/00* (2009.01)
(52) U.S. Cl. ...................................... 455/431; 455/426.1
(58) Field of Classification Search .................. 455/431, 455/573, 422.1, 430, 418–420, 456.4, 561, 455/575.9, 41.2, 41.3; 370/401, 389, 316, 370/328, 338
See application file for complete search history.

(56) References Cited

U.S. PATENT DOCUMENTS

| | | | |
|---|---|---|---|
| 4,729,102 A | 3/1988 | Miller, Jr. et al. | |
| 5,445,347 A | 8/1995 | Ng | |
| 5,761,625 A | 6/1998 | Honcik et al. | |
| 5,950,129 A * | 9/1999 | Schmid et al. | 455/431 |
| 6,047,165 A | 4/2000 | Wright et al. | |
| 6,201,797 B1 * | 3/2001 | Leuca et al. | 370/316 |
| 6,308,044 B1 | 10/2001 | Wright et al. | |
| 6,438,577 B1 * | 8/2002 | Owens | 709/203 |
| 6,788,935 B1 * | 9/2004 | McKenna et al. | 455/431 |
| 6,889,042 B2 * | 5/2005 | Rousseau et al. | 455/431 |
| 7,058,484 B1 | 6/2006 | Potega | |
| 7,174,187 B1 | 2/2007 | Ngan | |
| 7,187,927 B1 * | 3/2007 | Mitchell | 455/431 |
| 7,444,146 B1 | 10/2008 | Wright et al. | |

(Continued)

OTHER PUBLICATIONS

International Search Report Issued Jun. 30, 2008, in connection with related PCT Application No. PCT/ US2008/057509.

(Continued)

*Primary Examiner* — Brandon J Miller
(74) *Attorney, Agent, or Firm* — Ronald E. Prass, Jr.; Prass LLP (57) ABSTRACT

A multi-modal portable communications gateway for operation in an airport environment is disclosed. The multi-modal portable communications gateway may include a communication interface, a controller that controls the operation of the multi-modal portable communications gateway, a controller panel that includes a user interface to enable a user to interact with the multi-modal portable communications gateway, a WiFi antenna that enables reception and transmission of WiFi signals, a cellular antenna that enables reception and transmission of cellular signals, a power supply unit that enables power to be provided to the multi-modal portable communications gateway, wherein the controller signals the power supply unit to shut down based on one or more safety indication, a communication router that receives data from systems in the airport environment through the communication interface, and transmits the data to at least one predetermined location outside an aircraft upon receiving a signal from the controller, and one or more charging port that enables external electronic devices to be connected to the multi-modal portable communications gateway, wherein the power supply unit enables power to be provided to charge batteries of the external devices.

20 Claims, 4 Drawing Sheets

U.S. PATENT DOCUMENTS

| | | | | |
|---|---|---|---|---|
| 7,599,691 | B1* | 10/2009 | Mitchell | 455/431 |
| 7,630,710 | B2* | 12/2009 | Kauffman | 455/431 |
| 2003/0055792 | A1 | 3/2003 | Kinoshita et al. | |
| 2003/0157975 | A1* | 8/2003 | Kadel et al. | 455/575 |
| 2004/0106404 | A1* | 6/2004 | Gould et al. | 455/431 |
| 2004/0184466 | A1* | 9/2004 | Chang et al. | 370/401 |
| 2004/0205123 | A1* | 10/2004 | Terasawa | 709/203 |
| 2005/0159151 | A1* | 7/2005 | Eckelt | 455/431 |
| 2006/0183474 | A1* | 8/2006 | Ziarno et al. | 455/431 |
| 2006/0270354 | A1* | 11/2006 | de La Chapelle et al. | 455/66.1 |
| 2007/0042772 | A1* | 2/2007 | Salkini et al. | 455/431 |

OTHER PUBLICATIONS

ARINC; Plane Talk, AMC News; A Publication for the Avionics Maintenance Conference; vol. III, No. 2; Feb. 1992.

Erik M. Miller & Jonica Keel; Gatelink High Speed Communications with Parked Aircraft; SAE Technical Paper Series; Costa Mesa, California Sep. 27-30, 1993.

Jan Boer; Framework Update for 2 Mbit/s DSSS PHY; IEEEP802.11/93-68; Wireless Access Method and Physical Specification; May 5, 1993.

ARINC; AEEC Airlines Electronic Engineering Committee; Circulation of Gatelink Ad Hoc Meeting Report and Strawman Material; Apr. 5, 1991.

ARINC; Future Concepts for Maintenance; Report of the Portable Maintenance Access Terminal (PMAT) Working Group Meeting Held Aug. 24-25, 1994 in Bloomington, Minnesota; Sep. 1, 1994.

ARINC; Plane Talk; AMC News; A Publication for the Avionics Maintenance Conference; 1992 AMC Proves Valuable; vol. III, No. 7; Jul. 1992.

U.S. Army Information Systems; Military Standard; Interoperability and Performance Standards for Medium and High Frequency Radio Equipment; MIL-STD-188-141A; Notice 2; Sep. 10, 1993.

ARINC; Gate-Aircraft Terminal Environment Link (Gatelink)—Ground Side; Specification 632; (Exhibit 4); Dec. 30, 1994.

ARINC; Gate-Aircraft Terminal Environment Link (Gatelink)—Aircraft Side; ARINC Characteristic 751; (Exhibit 5); Jan. 1, 1994.

ARINC; Quick Access Recorder for AIDS System (QAR); ARINC Characteristic 591; (Exhibit 9); Jul. 26, 1972.

* cited by examiner

FIG.4

MULTI-MODAL PORTABLE COMMUNICATIONS GATEWAY

PRIORITY INFORMATION

This non-provisional application claims priority from U.S. Provisional Application Ser. Nos. 60/896,262, filed Mar. 21, 2007, and 60/914,311, filed Apr. 26, 2007, the content of which are incorporated herein by reference in their entireties.

BACKGROUND OF THE DISCLOSURE

1. Field of the Disclosure

The disclosure relates to mobile transaction processing devices.

2. Introduction

Current processes on aircraft are manual paper logs or require the removal of the equipment such as point of sale devices from the aircraft to another physical location typically in the airport proximity, to secure connectivity to various ground processor systems. Neither method is conducive to in-flight authorization for such services as duty free. Removing the devices from the aircraft incurs substantial costs for the airline including additional device costs, repair, and additional labor costs to update the devices (either catering or security staff). Current methods are costly and time consuming and the inherent delay contributes to possible lost revenue. Current methods also require that the devices be serviced outside the aircraft which also require substantially larger inventories of devices to ensure that charged devices are available for deployment as other devices have been removed for charging.

SUMMARY OF THE DISCLOSURE

A multi-modal portable communications gateway for operation in an airport environment is disclosed. The multi-modal portable communications gateway may include a communication interface, a controller that controls the operation of the multi-modal portable communications gateway, a controller panel that includes a user interface to enable a user to interact with the multi-modal portable communications gateway, a WiFi antenna that enables reception and transmission of WiFi signals, a cellular antenna that enables reception and transmission of cellular signals, a power supply unit that enables power to be provided to the multi-modal portable communications gateway, wherein the controller signals the power supply unit to shut down based on one or more safety indication, a communication router that receives data from systems in the airport environment through the communication interface, and transmits the data to at least one predetermined location outside an aircraft upon receiving a signal from the controller, and one or more charging port that enables external electronic devices to be connected to the multi-modal portable communications gateway, wherein the power supply unit enables power to be provided to charge batteries of the external devices.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure. Note that while this disclosure discusses aircraft and airline uses for the disclosure, the disclosure by no means limited to that area and may be applied to a wide variety of environment and uses.

This disclosure concerns a manageable communications system that may provide a capability previously unavailable for point of sale (POS) implementations in aircraft and vehicles. This communications system may enable a readily accessible path for purchase data, including but not limited to credit card transaction and inventory control data, to pass from a POS device on the aircraft or vehicle to a ground processor system via a transportable networking communications platform. This portable platform supports a number of different communications systems, including for example Wi-Fi, satellite, conventional ACARS on all available communications media, Ethernet, etc.

One such embodiment of the disclosure may be a communications system that may provide an automated and portable method of communicating credit card charges related to purchases on flights to a ground processor system for processing. The system may also include an aircraft or maintenance inventory management and control system, for example, for inventorying passenger service-related items, safety-of-flight items, duty free items, or the like. The system may include a transportable communications platform which enables, for example, wireless connectivity to POS devices, connectivity to the Internet, and a mechanism for charging the point of sale devices and/or batteries, or communication devices.

The platform may be capable of supporting several communications networks for passing the data to and from a ground processor system for additional processing, such as credit validation and determining appropriate commissions and inventory levels in near real time. The various communications media may include, for example, satellite, VHF/HF datalink, Wi-Fi, Cellular, Ethernet communications technologies, etc.

The system/platform may be designed to be self contained, which is to say that all physical items comprising the transportable system are contained within a single small profile, transportable unit. Such a design provides a simple and effective manner to transport, service, and utilize the system as a transportable mobile and quickly deployable system.

Figure 1:
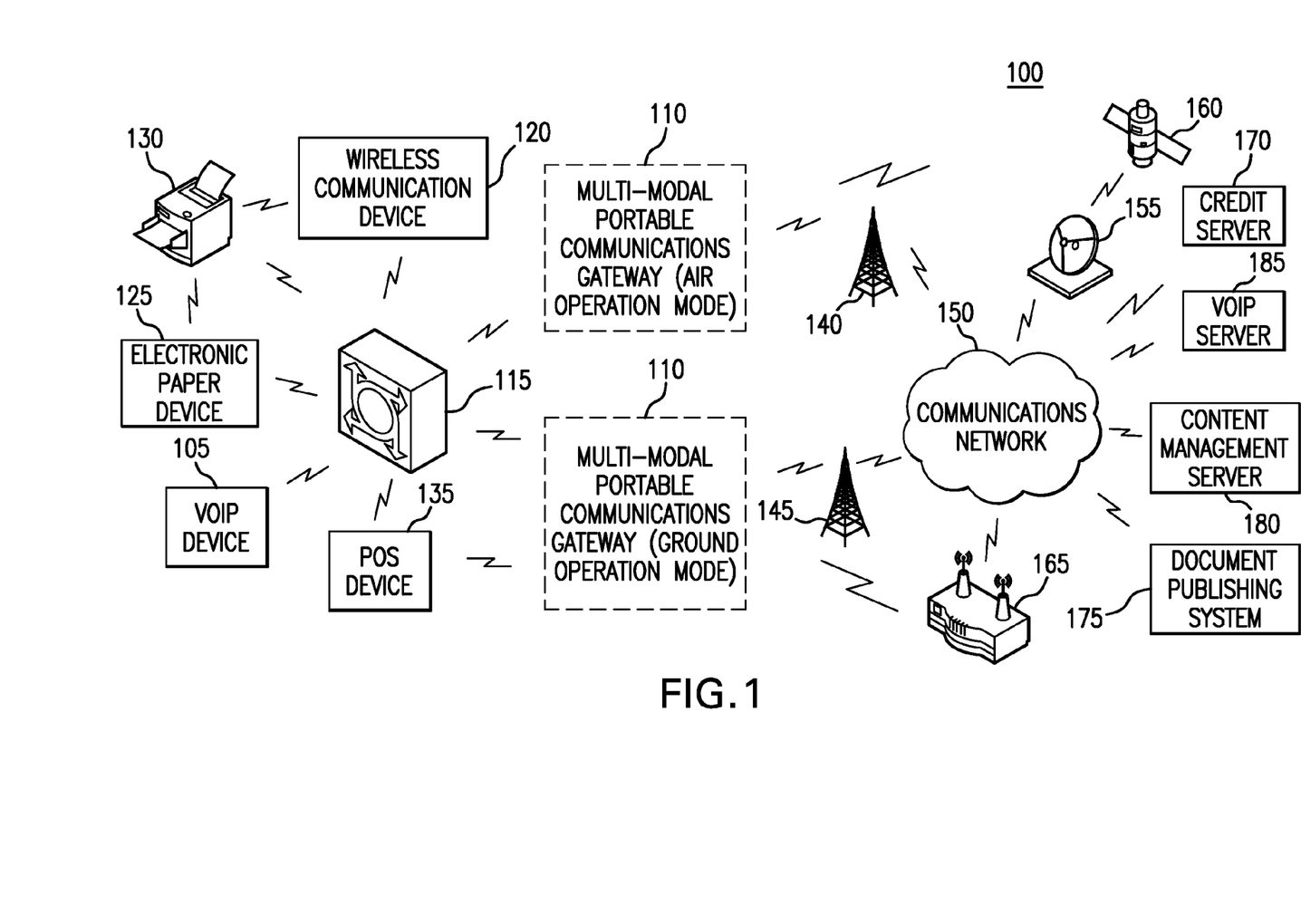
FIG. 1 illustrates an exemplary diagram of a multi-modal communications environment in accordance with a possible embodiment of the disclosure.

FIG. 1 illustrates an exemplary diagram of a multi-modal portable communications environment 100 in accordance with a possible embodiment of the disclosure. The multi-modal portable communications environment 100 is shown in a ground operation mode and an air operation mode for ease of discussion. The multi-modal portable communications environment 100 may include devices on-board an aircraft that may include, for example, a wireless communication device 120, communications server 115, Voice over Internet Protocol (VoIP) device 105, POS device 135, electronic paper device 125, and one or more printers 130. External to the aircraft, the multi-modal portal communications environment 100 may include the communications network 150, communications towers 140, 145, satellite dish 155, satellite 160, airport local area network (LAN) 165, credit server 170, document publishing system 175, content management server 180, and VoIP server 185.

The wireless communication device 120 may represent one or more portable MP3 player, satellite radio receiver, AM/FM radio receiver, satellite television, portable music player, portable computer, wireless radio, wireless telephone, portable digital video recorder, cellular telephone, mobile telephone, Voice over Internet Protocol (VoIP) telephone, personal digital assistant (PDA), or combinations of the above, for example. Electronic paper device 125 may be any device that uses electronic paper for viewing and interaction by passengers in the cabin, pilots in the cockpit, and crewmembers.

The VoIP device 105 may represent one or more wired or wireless device capable of transmitting and receiving VoIP communications, such as a VoIP telephone, computer, or the like. The VoIP communications from the VoIP device may be managed through the VoIP server 185 which communicates with the multi-modal portable communication gateway 110 via communications network 150, for example. VoIP server 185 may receive communications from other external VoIP devices and route them to the VoIP device 105 via the multi-modal portable communication gateway 110 and communications network 150, for example.

The POS device 135 may represent one or more point-of-sale transaction devices whereby crewmembers can process passengers' credit cards for passengers' purchase of items from the airlines catalog, duty-free catalog, reading material, listening material, entertainment material, etc. Communications server 115 may represent any server, computer, etc. with the processor and memory that can process and store data, and send and receive data to and from the multi-modal portable communications gateway 110. Data transmitted and received data may include Internet protocol (IP) data, ACARS text, Internet Protocol (IP) voice stream, and various data files.

One of skill in the art will appreciate that the communications network 150 may be any possible configuration in which the multi-modal portable communications gateway 110 may communicate with devices outside the aircraft. As such, communications network 150 may represent any communication and/or media network, such as the Internet, intranet, telephone network, wireless network, cable television network, satellite television network, satellite radio network or any other network system, for example. Communications network 150 may communicate with the multi-modal portable communications gateway 110 through one or more communication towers 140, 145, for example. The multi-modal portable communications gateway 110 may also communicate with the communications network 150 via satellite 160 through satellite dish 155, for example. In addition, the multi-modal portable communications gateway 110 may communicate with the communications network 150 through an airport local area network (LAN) 165, for example.

Through the communications network 150, crewmembers on the aircraft may use the multi-modal portable communications gateway 110 to communicate with a credit server 170 for recording and confirm credit for point-of-sale transactions. The multi-modal portable communications gateway 110 may also communicate with a content management server 180 to obtain passenger entertainment material that may be presented on an electronic paper device 125, for example, such as newspapers, magazines, books, games, etc. Pilots and crewmembers may also send information out through the multi-modal portable communications gateway 110 using the electronic paper device 125.

The multi-modal portable communications gateway 110 may also communicate with a document publishing system 175 to obtain the latest aviation documents, such as approach plates, charts, maps, Notices to Airmen (NOTAMS), Airmen's Meteorological Information (AIRMETS), Significant Meteorological Information (SIGMETS), aircraft publications, Flight Crew Operating Manual (FCOM), Fault Reporting Manual (FRM), Master (or Minimum) Equipment List (MEL), Configuration Deviation List (CDL), and other safety-of-flight related information.

Note that the multi-modal portable communications gateway 110 is shown and any air and ground mode operation. Some of the functions performed by the multi-modal portable communications gateway 110 may be performed and data may be transmitted while in the air while other functions may be performed and data may be transmitted while on the ground for safety of flight reasons, for example. Furthermore, while connections in the figures are shown as wireless, these connections may also be wired.

Figure 2:
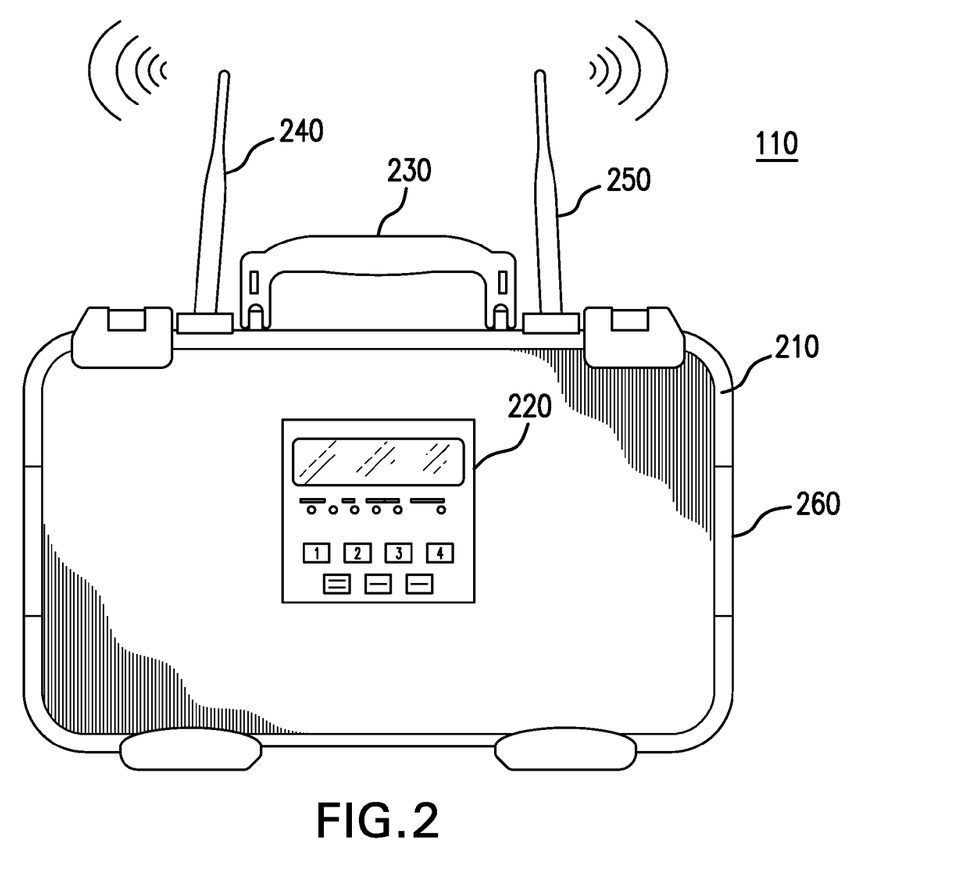
FIG. 2 illustrates an exemplary diagram of a multi-modal portable communication gateway in accordance with a possible embodiment of the disclosure.

FIG. 2 illustrates an exemplary diagram of a multi-modal portable communication gateway 110 in accordance with a possible embodiment of the disclosure. The multi-modal portable communications gateway 110 may include chassis 210, controller panel 220, handle 230, WiFi antenna 240, cellular antenna 250, and charging/communication ports 260.

The chassis 210 may be made of any durable material, such as plastic or metal, and houses the components of the multi-modal portable communications gateway 110. Handle 230 serves to facilitate transporting the multi-modal portable communication gateway 110 on and off or throughout the aircraft.

The controller panel 220 may provide a user interface so that user may properly control and interact with the multi-modal portable communication gateway 110. The user interface on the controller panel 220 may include one or more buttons, a touchscreen, light emitting diodes (LEDs), a display panel, knobs, switches, or other mechanisms known to one of skill in the art to facilitate the user's interaction with the multi-modal portable communication gateway 110.

The multi-modal portable communication gateway 110 may also include one or more antenna to facilitate communications in a particular communications mode. For example, the multi-modal communications gateway 110 in FIG. 2 shows a WiFi antenna 240 for communicating with a WiFi network, and a cellular antenna 250 for communications with a cellular network. The multi-modal portable communications gateway 110 may also include other antennae to communicate using other communication modes.

The charging/communication ports 260 may be located at any practical and convenient location on the multi-modal portable communication gateway 110. The charging/communication ports 260 may enable the multi-modal portable communication gateway 110 to be recharged by external power sources, such as an external AC wall socket, etc. The charging/communication ports 260 may include any known or future ports that may enable communication with the multi-modal portable communication gateway 110 or other devices, such as a Universal Serial Bus (USB), Ethernet connections (such as the RJ45), data transmission connections, external WiFi or Internet connection, etc. The charging/communication ports 350 may also enable recharging of external devices, such as the point-of-sale device 130, electronic paper device 125, or other wireless communication devices 120, for example.

Figure 3:
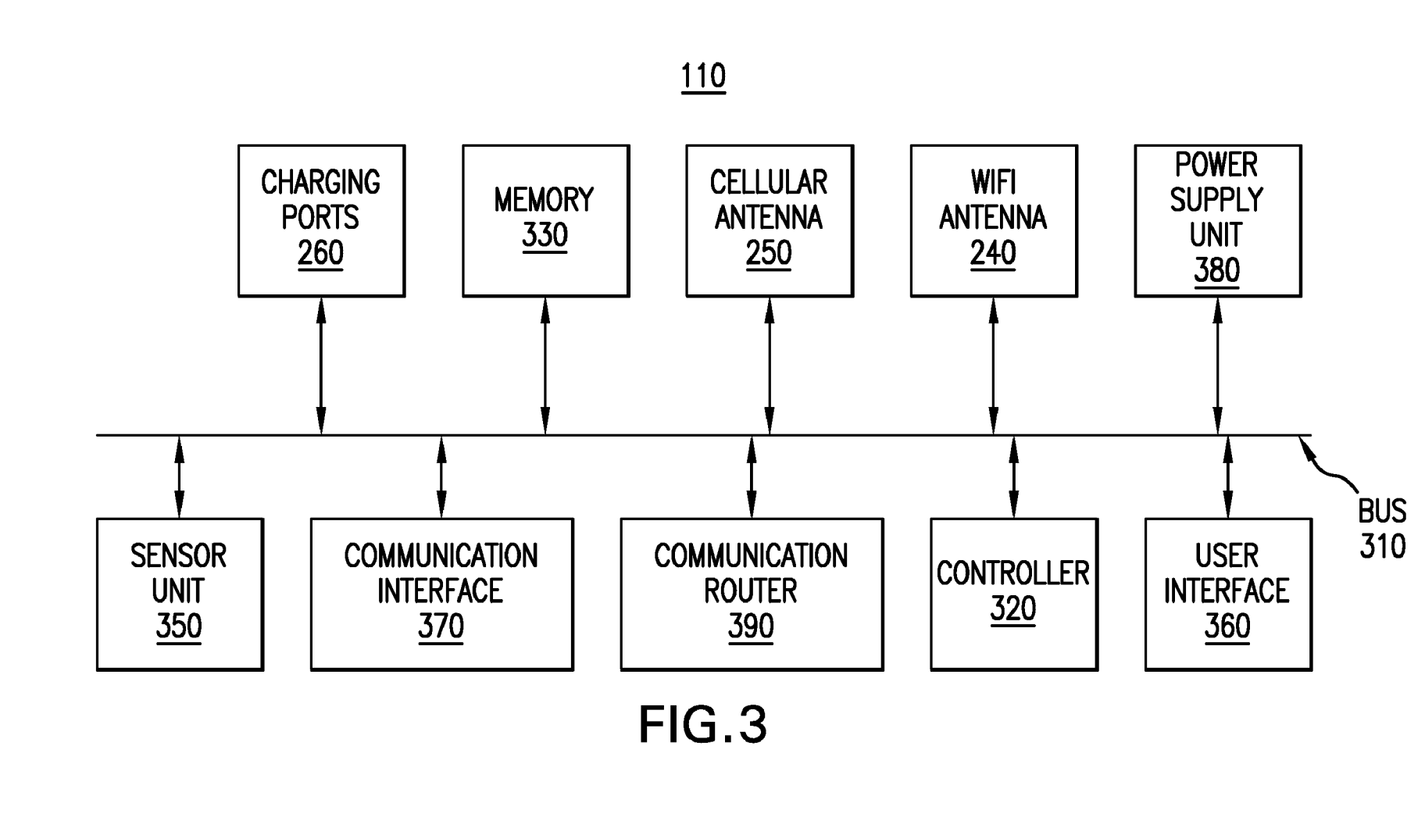
FIG. 3 illustrates an exemplary block diagram of a multi-modal portable communication gateway in accordance with a possible embodiment of the disclosure.

FIG. 3 illustrates an exemplary diagram of one possible embodiment of a multi-modal portable communications gateway 110 in accordance with a possible embodiment of the disclosure. The multi-modal portable communications gateway 110 may include bus 310, controller 320, memory 330, WiFi antenna 240, cellular antenna 250, charging/communication ports 260, sensor unit 350, user interface 360, communication interface 370, power supply unit 380, and communication router 390.

Bus 310 may permit communication among the components of the multi-modal communication gateway 110.

Controller 320 may include at least one conventional processor or microprocessor that interprets and executes instructions. Memory 330 may be a random access memory (RAM) or another type of dynamic storage device that stores information and instructions for execution by controller 320. Memory 330 may also include a read-only memory (ROM) which may include a conventional ROM device or another type of static storage device that stores static information and instructions for controller 320.

The communication router 390 may include one or more devices to route, transmit and receive data to and from the multi-modal portable communication gateway 110. The communication router 390 may include sufficient functionality to interface with any network or communications station and may be defined by hardware or software in any manner known to one of skill in the art. The controller 320 is cooperatively operable with the communication router 390 to support operations within one or more communications network 150. The communication router 390 may transmit and receive transmissions via one or more of the antennae 240, 250 as discussed above in a manner known to those of skill in the art.

The communication interface 370 may include any mechanism that facilitates communication via one or more communications network 150. For example, communication interface 370 may include a modem. Alternatively, communication interface 370 may include other mechanisms for assisting the communication router 390 in communicating with other devices and/or systems via wireless connections.

The sensor unit 350 may include one or more sensor or sensing logic, or communicate with external sensors, to enable one or more functions of the multi-modal portable communications gateway 110 to be powered on or off. For example, the sensor unit 350 may include or receive input from a number of sensors, including a pressure sensor to enable the powering on or off of multi-modal portable communications gateway 110 features based on the atmospheric or cabin pressure reading, a weight on wheel sensor, a cabin door sensor, etc.

As discussed above, user interface 360 may be located on the controller panel 220 and may include one or more conventional input mechanisms that permit a user to input information, communicate with the multi-modal portable communication gateway 110, and/or present information to the user, such as a an electronic display, microphone, touchpad, keypad, keyboard, mouse, pen, stylus, voice recognition device, buttons, one or more speakers, etc.

Power supply unit 380 may enable the multi-modal portable communication gateway 110 to be powered by both AC and DC power. The power supply unit 380 may permit the recharging of the multi-modal portable communication gateway 110 batteries or other DC power source. The DC power capability enables the multi-modal portable communication gateway 110 to operate as a portable apparatus, free of any power lines, harnesses, or cords. In addition, the power supply unit 380 may work in conjunction with charging ports 260 to enable recharging of external devices, such as the point-of-sale device 130, electronic paper device 125, VoIP devices 105, or other wireless communication devices 120, for example.

The multi-modal portable communication gateway 110 may perform such functions in response to controller 320 by executing sequences of instructions contained in a computer-readable medium, such as, for example, memory 330. Such instructions may be read into memory 330 from another computer-readable medium, such as a storage device or from a separate device via communication interface 370.

For illustrative purposes, the functions of the multi-modal portable communication gateway 110 and the multi-modal portable communication process will be described below in relation to the diagrams shown in FIGS. 1-3.

Figure 4:
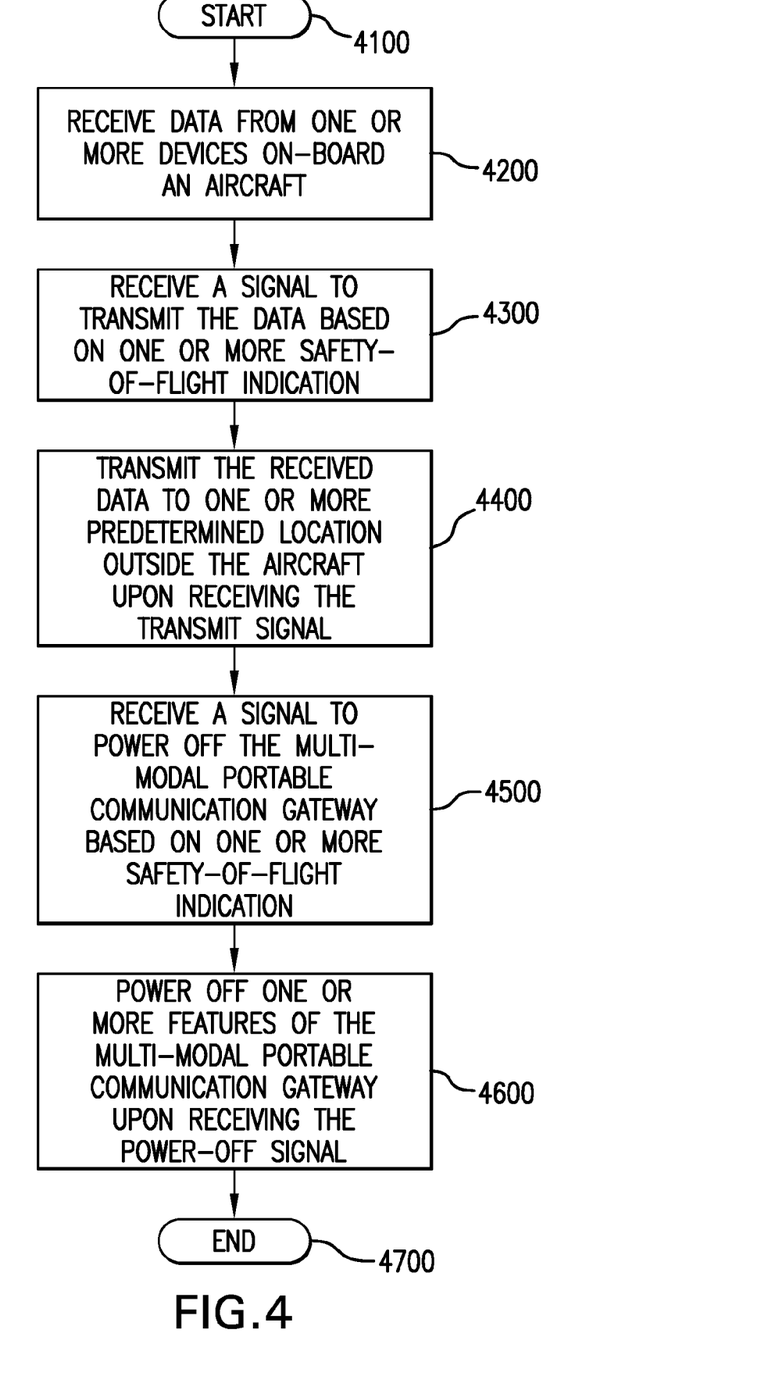
FIG. 4 illustrates an exemplary flowchart of a multi-modal portable communication gateway process in accordance with a possible embodiment of the disclosure.

FIG. 4 illustrates an exemplary flowchart of a possible multi-modal portable communication gateway process in accordance with a possible embodiment of the disclosure. The process begins at step 4100 and goes to step 4200, where the multi-modal portable communications gateway 110 may receive data from one or more devices onboard an aircraft. At step 4300, the multi-modal portable communication gateway 110 may receive a signal to transmit the received data based on one or more safety of flight indication. A safety-of-flight indication may be one of a signal from a weight-on-wheels sensor that the aircraft's wheels are down or that the aircraft's wheels are up, a signal from a sensor that indicates that the aircraft has pulled away from a gate or that the aircraft has pulled up to a gate, a signal from a cabin door sensor that that the aircraft's cabin doors are closed or are open, a signal from the aircraft's cockpit, a signal from the aircraft's crew station, a signal from an altitude sensor, or a signal from a pressure cabin or atmospheric pressure sensor.

At step 4400, the multi-modal portable communications gateway 110 may transmit the received data to a predetermined location upon receiving the transmit signal. At step 4500, the multi-modal portable communications gateway 110 may receive a signal to power off based on one or more safety of flight indication. At step 4600, the multi-modal portable communication gateway 110 may power off one or more features of the multi-modal portable communications gateway 110 upon receiving a power off-signal based on the safety of flight indication. The process then goes to step 4700, and ends.

Note that the multi-modal portable communication gateway 110 may also power on one or more features of the multi-modal portable communications gateway 110 upon receiving a power on-signal based on one or more of the safety-of-flight indications listed above.

A unique capability in this disclosure as discussed above is that the multi-modal portable communication gateway 110 supports multiple inbound communications options from POS devices 135 into including, but not limited to, wireless connectivity. This functionality may allow the user to release data from the POS devices 135 into the multi-modal portable communication gateway 110 based on preference of user and POS device 135. The wireless capability does not preclude a hard wired connection from POS device 135 to the multi-modal portable communication gateway 110 using, for example, a USB connection.

The multi-modal portable communication gateway 110 may also support multiple outbound communications options from the multi-modal portable communication gateway 110 to a ground processor/server, enabling the selection of the outbound transport based on user preferences. The outbound communications options may be implemented in parallel, allowing the user to have multiple options for sending the data to the ground processor/server.

A unique capability may exist in the communication interface 370 that may allow the data from the POS device 135 to traverse a network with alternate communications protocol. An example may be the utilization of ACARS as an outbound communications path for POS data originating in Internet Protocol (IP). There may be a requirement to translate the IP packets into those capable of being sent through the ACARS network, and conversely, to receive the ACARS packets and translate the information to an IP format.

The multi-modal portable communication gateway 110 may uniquely support the temporary storage of data from the POS device 135 until outbound connectivity is established, enabling the potential selection of specific data from the same POS device 135 to use alternate media. For example, the POS devices 135 uploads all credit card charges at one time to the multi-modal portable communication gateway 110, and all charges greater than a defined threshold ($100, for example) are immediately verified through outbound satellite communications, while the remainder are held until an alternate (such as lower cost) communications option, such as cellular, is established.

The power supply unit 380 system to control power to the multi-modal portable communication gateway 110 may allow the user to visually verify that power may be available. The system may also have an interruptible capability in the event that it is for necessary to turn the multi-modal portable communication gateway 110 off under certain conditions.

A unique capability of the multi-modal portable communication gateway 110 may be the capability of recharging the POS device 135 or the POS battery while on the aircraft. This capability may be provided through a number of different options, including a cradle for the POS device 135 or the POS battery.

Through a voltage adaptor, the multi-modal portable communication gateway 110 may be capable of powering several units of differing power requirements simultaneously. The multi-modal portable communication gateway 110 may contain a rechargeable power source that can be recharged through several different options, including replacing the battery itself.

There may be a need to alert for low power in the multi-modal portable communication gateway 110, and the capability may be included to visually alert the users, such as through an LED, LCD, lights, a display, or other indicator. There may also be an interruptible switch allowing the user to cut power to the unit when necessary. The unit itself may support all types of physical connectors for powering the POS device 135 and/or its battery.

Possible Uses for the multi-modal portable communication gateway 110 may be, for example:
- Support point of sale application on aircraft to accept payment in cash, credit card, gift card, frequent flier miles, pre-paid card, and bar code
- Supports the implementation of Radio Frequency Identification (RFID) for purchase on board
- Supports the delivery and presentation of crew manuals and other documentation to the crew members
- Supports the delivery and presentation of maintenance requests generated by the crew while on the aircraft
- Supports the delivery of connecting gate information to crew members while on the aircraft
- Supports the delivery of new boarding passes to passengers on board the aircraft when needed
- Provides recharging capabilities for portable in-flight entertainment units
- Supports the delivery and presentation of passenger-related content, such as news and related travel information
- Supports the delivery and presentation to the crew of passenger information in the form of lists or other means
- Supports a VoIP communications and may act as a VoIP gateway server to route VoIP communications.

Possible user implementations of the multi-modal portable communication gateway 110 may be, for example:
- The multi-modal portable communication gateway 110 may be secured on an aircraft in a cradle, or docking station, that may be permanently installed in the:
  - Galley
  - Crew rest areas
  - Cockpit
  - Closet
- The multi-modal portable communication gateway 110 may not be secured in any cradle and is used in a mobile application and may be:
  - Stored in closet until altitude is reached
- The multi-modal portable communication gateway 110 may be stored until altitude reached, then may be placed in cradle
- The multi-modal portable communication gateway 110 may be stored at the airport and carried onto the aircraft (mobile application)
  - From gate area
  - From support vehicle
  - From crew rest area
- The multi-modal portable communication gateway 110 may be mounted on support vehicle
- Combination of types of connectivity is user-defined and can be varied.

A sample implementation may be the following: The device may be stored in a closet in the galley until flight level has been reached (greater than 10,000 feet). At this time, a flight attendant may remove the multi-modal portable communication gateway 110 from the closet and secure it in the galley (by placing it at a designated place on the counter.) The flight attendant may then connect the power cord to the AC adaptor in the galley for recharging, and plug any connectors (i.e., Ethernet or VDL) into the device. The flight attendant may then power up the multi-modal portable communication gateway 110. The multi-modal portable communication gateway 110 may "power up" and recognize available connectivity options. Once powered up, the flight attendant may be able to use the multi-modal portable communication gateway 110 according to the manual, which will indicate how the POS device 135 or other devices will connect to the multi-modal portable communication gateway 110. On decent, the multi-modal portable communication gateway 110 may be turned off by the flight attendant or turn off automatically and re-stowed in the closet. Once the aircraft is on the ground, the flight attendant may again power up the multi-modal portable communication gateway 110 without removing it from the closet. The multi-modal portable communication gateway 110 may stay with power until the next flight, when doors close, or when the flight attendant powers off the unit.

The multi-modal portable communication gateway 110 may be manufactured to meet the customer-defined inputs, but may support the following derivatives:
  Power, for example:
    Single or multiple batteries in the device
    Support for single voltage output, or multiple, variable voltages
    User-controlled power to networks
    User-controlled power to recharging devices
    Variety of power cords for recharging the device by:
      AC adaptor
      DC adaptor
      Battery exchange
      USB
  Device Connectivity, for example:
  Local area connectivity options
    Wi-Fi
    USB
    Bluetooth
    Ethernet
    Infrared
    Firewire
    Serial
    Wi-MAX
  Wide Area connectivity options
    Wi-Fi
    Cellular
    ACARS
    Satellite
    Ethernet
    Wi-MAX
    USB
    ARINC 429
  External ports
    USB
    RJ45
    Charging ports for external devices
    Charging ports for charging internal batteries from external sources
    Communications ports The multi-modal portable communication gateway 110 may be provided in a number of enclosures that are differentiated in any of these characteristics:
  Size
  Color
  Locking mechanism
  Weatherproof
  Handles
  Wheels
  External ports Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the disclosed system each processing the content in various possible ways. It does not necessarily need to be one system used by all end users. Accordingly, the appended claims and their legal equivalents should only define the disclosure, rather than any specific examples given.

We claim

1. A multi-modal portable communications gateway for operation in an airport environment, comprising: a communication interface; a controller that controls the operation of the multi-modal portable communications gateway; a controller panel that includes a user interface to enable a user to interact with the multi-modal portable communications gateway; a WiFi antenna that enables reception and transmission of WiFi signals; a cellular antenna that enables reception and transmission of cellular signals; a power supply unit that enables power to be provided to the multi-modal portable communications gateway, wherein the controller signals the power supply unit to shut down based on one or more safety indication; a communication router that receives data from systems in the airport environment through the communication interface, and transmits the data to at least one predetermined location outside an aircraft upon receiving a signal from the controller; and one or more charging port that enables external electronic devices to be connected to the multi-modal portable communications gateway, wherein the power supply unit enables power to be provided to charge batteries of the external devices.

2. The multi-modal portable communications gateway of claim 1, wherein the one or more safety indication is a safety-of-flight indication, the safety-of-flight indication being one of a signal that the aircraft's wheels are down, a signal that the aircraft's wheels are up, a signal that the aircraft has pulled away from a gate, a signal that the aircraft has pulled up to a gate, a signal that the aircraft's cabin doors are closed, a signal that the aircraft's cabin doors are open, a signal from the aircraft's cockpit, a signal from the aircraft's crew station, a signal from an altitude sensor, and a signal from a pressure sensor.

3. The multi-modal portable communications gateway of claim 1, wherein the controller panel includes a keypad.

4. The multi-modal portable communications gateway of claim 1, wherein the communication router transmits data automatically when a signal is received from one or more sensors, the sensors being at least one of a weight-on-wheels sensor, an altitude sensor, a pressure sensor, and a cabin door sensor.

5. The multi-modal portable communications gateway of claim 1, wherein the multi-modal portable communications gateway operates from at least one of the aircraft, the aircraft support vehicle, an airport gate, and an airport.

6. The multi-modal portable communications gateway of claim 1, wherein the multi-modal portable communications gateway transmits at least one of passenger information, and ticketing information.

7. The multi-modal portable communications gateway of claim 1, wherein the multi-modal portable communications gateway transmits maintenance information.

8. The multi-modal portable communications gateway of claim 1, wherein the communication router receives data from at least one of a point of sale device, an aircraft system, an electronic device, a cellular phone, a Voice over Internet Protocol (VoIP) device, and a portable communications device.

9. The multi-modal portable communications gateway of claim 8, wherein the point-of-sale data is transmitted to a credit server.

10. The multi-modal portable communications gateway of claim 1, wherein the controller signals the power supply unit to power on based on one or more safety-of-flight indication.

11. A method of receiving and transmitting data for operation in an airport environment using a multi-modal portable communications gateway, comprising: receiving input from a user through a control panel that includes a user interface; receiving data from systems in the airport environment using one of a WiFi antenna and a cellular antenna; receiving a signal to transmit the data; transmitting the received data using one of the WiFi antenna and the cellular antenna to one or more predetermined location outside an aircraft upon receiving the transmit signal; charging batteries of external devices using one or more charging port when the external devices are connected to the multi-modal portable communications gateway; receiving a signal to power off the multi-modal portable communications gateway based on one or more safety indication; and powering off the multi-modal portable communications gateway upon receiving the power-off signal.

12. The method of claim 11, wherein the one or more safety indication is a safety-of-flight indication, the safety-of-flight indication being one of a signal that the aircraft's wheels are down, a signal that the aircraft's wheels are up, a signal that the aircraft has pulled away from a gate, a signal that the aircraft has pulled up to a gate, a signal that the aircraft's cabin doors are closed, a signal that the aircraft's cabin doors are open, a signal from the aircraft's cockpit, a signal from the aircraft's crew station, a signal from an altitude sensor, and a signal from a pressure sensor.

13. The method of claim 11, further comprising: receiving information entries from the user interface.

14. The method of claim 11, wherein the data is transmitted automatically when a signal is received from one or more sensors, the sensors being at least one of a weight-on-wheels sensor, an altitude sensor, a pressure sensor, and a cabin door sensor.

15. The method of claim 11, further comprising:
receiving at least one of WiFi signals and cellular signals; and
transmitting the at least one WiFi signals and cellular signals.

16. The method of claim 11, wherein the multi-modal portable communications gateway operates from at least one of the aircraft, the aircraft support vehicle, an airport gate, and an airport.

17. The method of claim 11, wherein the data transmitted is at least one of passenger information, ticketing information, and maintenance information.

18. The method of claim 11, wherein data is received from at least one of a point of sale device, an aircraft system, a electronic device, a cellular phone, a Voice over Internet Protocol (VoIP) device, and a portable communications device.

19. The method of claim 18, wherein the point-of-sale data is transmitted to a credit server.

20. The method of claim 11, further comprising:
powering on the multi-modal portable communications gateway based on one or more safety-of-flight indication.

* * * * *